United States Patent [19]

Oncken

[11] Patent Number: 4,586,701

[45] Date of Patent: May 6, 1986

[54] DRILL PRESS VISE ASSEMBLY

[76] Inventor: Harold W. Oncken, 238 E. First St., Hermann, Mo. 65041

[21] Appl. No.: 759,302

[22] Filed: Jul. 26, 1985

[51] Int. Cl.[4] .............................................. B23Q 3/08

[52] U.S. Cl. ...................................... 269/25; 269/35; 269/77; 269/95; 269/221

[58] Field of Search .................................. 408/90-92, 408/95-98, 103-109; 269/77-78, 95, 97-98, 253, 25, 35, 221

[56] References Cited

U.S. PATENT DOCUMENTS

| | | | |
|---|---|---|---|
| 2,552,580 | 5/1951 | Persson | 269/78 |
| 2,856,799 | 10/1958 | De Curtis | 408/103 |
| 2,973,674 | 3/1961 | Hladik | 269/77 |
| 4,025,064 | 5/1977 | Disston et al. | 269/97 |

*Primary Examiner*—Robert C. Watson
*Attorney, Agent, or Firm*—Polster, Polster and Lucchesi

[57] ABSTRACT

A vise assembly, for use on a drill press having a vertical cylindrical column and a table with a flat upper surface substantially perpendicular to the column, has a mounting block slidably and rotatably mounted on the column and a frame slidably mounted on the mounting block for movement parallel to the flat top surface of the table. The frame includes a back plate, at least two pairs of rods connected to the back plate, fixed and movable jaws, one of the pair of rods being connected to the fixed jaw and the other of the pairs of rods being connected to the movable jaw. The jaws normally rest on the table. In the preferred embodiment, hydraulic cylinders, carried by the back plate, are connected to move the pair of rods connected to the movable jaw. In another embodiment, a manually operated screw arrangement is used to move one pair of rods relative to the other, to move the movable jaw toward the fixed jaw. The entire frame may be moved manually toward and away from the column and rotated with respect to the column so as to position the jaws in any desired position with respect to the table, before or after a workpiece has been mounted in the jaws.

7 Claims, 6 Drawing Figures

DRILL PRESS VISE ASSEMBLY

BACKGROUND OF THE INVENTION

Unless a work piece is secured to the table of a drill press, drilling a hole is likely to be a hazardous task. Machinist vises are generally keyed and bolted or simply bolted to the table, when they are secured at all, but such an arrangement makes adjustment in the position of work pieces with respect to the drill difficult.

One of the objects of this invention is to provide a drill press vise assembly that is safe and highly versatile, rugged, simple and dependable.

Other objects will become apparent to those skilled in the art in the light of the following description and accompanying drawings.

SUMMARY OF THE INVENTION

In accordance with this invention, generally stated, a vise assembly for use on a drill press having a vertical cylindrical column and a table with a flat surface substantially perpendicular to the column is provide, the assembly including a mounting block slidably and rotatably mounted on the vertical column, and a frame slidably mounted on the mounting block for movement parallel to the surface of the table, toward and away from the column. The frame includes a back plate, at least two pairs of rods connected to the back plate, and fixed and moveable jaws. The rods of at least one of the pairs of rods are journaled for lengthwise movement in the mounting block substantially perpendicular to the column and parallel with the flat surface of the table. The rods of one of the pairs of rods are connected with the fixed jaw and the others of the pairs of rods are connected to the movable jaw. The entire frame is rotatable with the mounting block about the vertical column of the drill press and translatable toward and away from the column. In the several embodiments, different means are provided, all carried by the frame, for transmitting force between the back plate and the movable jaw for moving the movable jaw towards the fixed jaw.

DESCRIPTION OF THE PREFERRED EMBODIMENT

Figure 1:
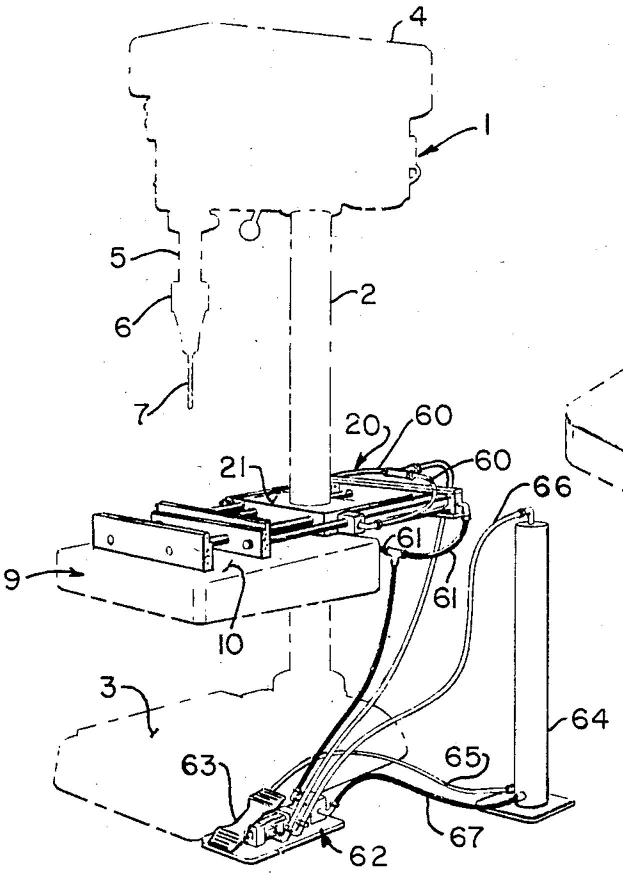
FIG. 1 is a view in perspective, with a drill press and table in phantom lines, of one embodiment of vise assembly of this invention.
Figure 2:
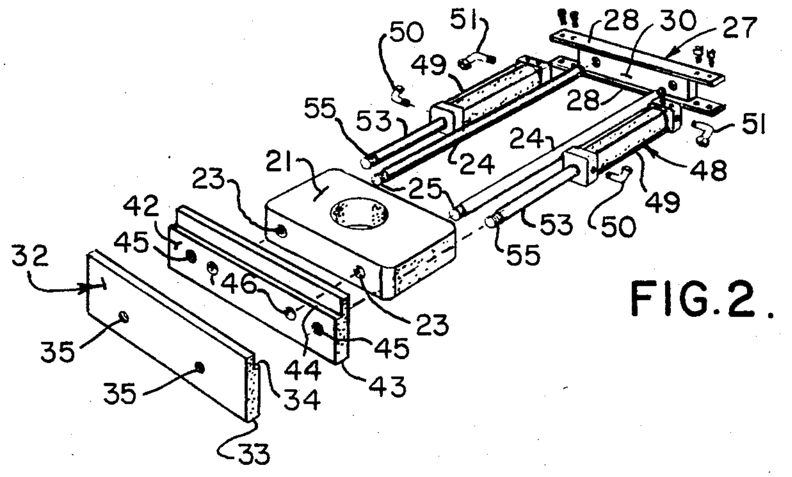
FIG. 2 is an exploded view of the vise assembly of FIG. 1.

Referring now to FIGS. 1 and 2 for one illustrative embodiment of this invention, reference numeral 1 indicates a drill press with a vertical column 2 supported by a heavy base 3, and a conventional drill head 4 containing a drive motor, not here shown. The drive motor is connected, through the usual splined connection to a spindle 5 carrying a chuck 6 in which a drill 7 is mounted. A conventional hand wheel 8 provides the means for moving the spindle 5, hence the drill 7, up and down through a limited distance.

A table 9, mounted for selective movement up and down the column, has a flat upper surface 10, substantially perpendicular to the axis of the column.

A vise assembly 20 of this invention is mounted on the column 2 above the surface 10 of the table 9. The mounting means in the preferred embodiment is a solid rectangular mounting block 21, mounted on and around the column 2 and extending laterally from the column. Journal passages 23, one on either side of the column 2, extend through the mounting block 21. The axes of the passages 23 are parallel with one another and parallel with the plane of the surface 10 of the table.

The remaining essential elements of the vise assembly carried by the block 21 constitute a frame, made up of slide rods 24 slidably journaled in the journal passages 23, a heavy back plate 27, a fixed jaw 32, a movable jaw 42, and a drive assembly 48 which, in this embodiment, comprises drive rods 53 and hydraulic cylinders 49.

In this embodiment, the back plate 27 includes upper and lower flanges 28 and a connecting web 30. The fixed jaw 32 has a flat lower surface 33 adapted to rest flat on the upper surface 10 of the table and a conventional step 34 to receive a work piece. The fixed jaw has a pair of tapped holes 35 to receive threaded ends 25 of the slide rods 24. The movable jaw 42 has a flat lower surface 43, adapted to rest flat on the surface 10 of the table, and a step 44. The movable jaw has tapped holes 45 to receive threaded ends 55 of drive rods 53, and a pair of passages 46 inboard of the holes 45, through which slide rods 24 extend slidably.

The hydraulic cylinder 49 has at its inner or "column" end, an air line fitting 50, and at the outer or "back plate" end, an oil line fitting 51. The air line fittings 50 of the two cylinders are connected to air lines 60, which are in turn connected by a common line to a valve 62. The oil line fittings 51 are connected to oil lines 61, which are in turn connected through a common line to the valve 62. The valve 62, which is provided with a foot control pedal 63, is connected to a source of air under pressure, not here shown, through a pressure line 65, which communicates, through the valve 62, with an air line 66 connected to communicate with a vertical oil tank 64, which supplies oil under pressure, through an oil line 67, to the oil lines 61 when the valve is thrown to the proper position. The lines 60 and 61 are flexible, to permit movement of the cylinders, and the construction and operation of the valve 62, tank 64, and cylinders 49 are all conventional.

The table 9 on many conventional drill presses is raised and lowered by a rack and pinion arrangement, the rack being mounted on the column 2. In such an arrangement, the mounting block 21 can have a slot 22 extending heightwise through it to clear the rack, and extending peripherally of the passage by which it is mounted on the column sufficiently far to permit substantial rotation of the block with respect to the column even when the block is within the reach of the rack.

The mounting block 21 may also be provided with a tapped hole to accept a set screw or cap screw, preferably of a type that will not score the cylinder, by which the mounting block and frame can be fixed in a position above the table if the jaws 32 and 42 are not to be used or fixed against rotation at any position.

In the operation of this embodiment of the vise assembly, the mounting block 21 is normally free to rotate about the column and to slide vertically on the column. Under these circumstances, the flat under surfaces 33 and 43 of the jaws rest flat upon the flat surface 10 of the table. The entire frame, and therefore both jaws can be swung, with the mounting block, about the column into any desired position on the table, and the jaws can be moved manually, by sliding the hardened slide rods 24 in the journal passages 23, which moves the back plate 27, hence the drive assembly and the movable jaw 42, anywhere from a position against the mounting block 21 to a position at or beyond the outer edge of the table 9 with respect to the column 2. The valve 62 can be operated to admit air to the "column" end of the cylinders 49, to force the pistons, of which the drive rods 53 are extensions, toward the back plate end, thus moving the movable jaw 42 away from the fixed jaw 32 sufficiently to receive the work piece. The valve 62 can then be actuated to admit oil under pressure to the back plate end of the cylinders, moving the movable jaw toward the fixed jaw until the work piece is securely clamped. The work piece can then be put into its final position for drilling by moving the entire frame either toward or away from the column, or by rotating the frame with respect to the column, or both.

Figure 3:
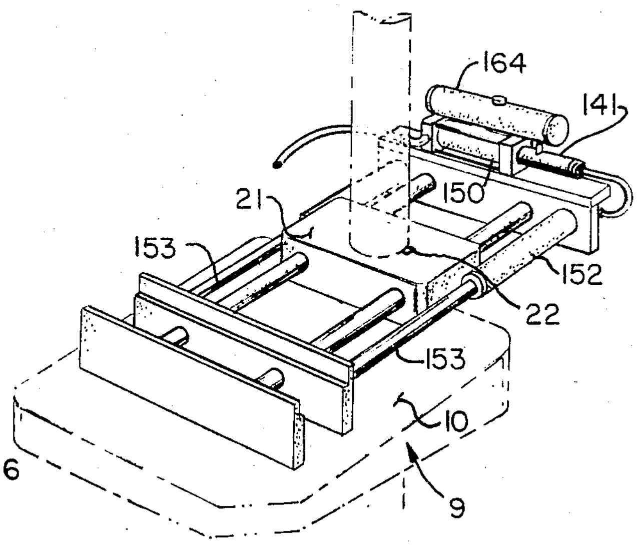
FIG. 3 is a view in perspective of another embodiment of vise assembly of this invention.
Figure 4:
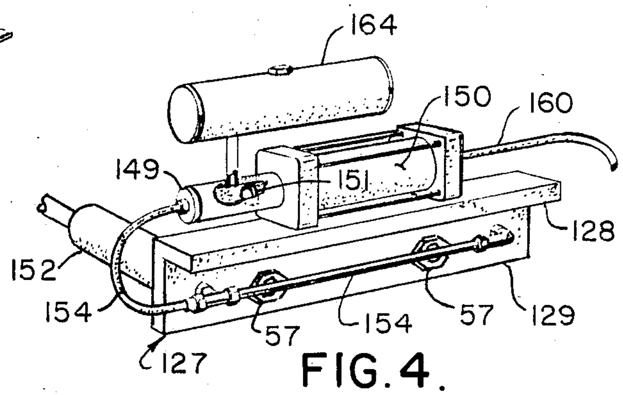
FIG. 4 is a fragmentary view in perspective, partly broken away, and somewhat enlarged, showing the rear of the vise assembly illustrated in FIG. 3.

Referring now to FIGS. 3 and 4 for another embodiment of vise assembly of this invention, reference numeral 120 indicates the completed assembly, which is in all respects identical with the embodiment shown in FIGS. 1 and 2 except for a slightly different construction of a back plate 127 and a drive assembly 148. In this embodiment, the back plate 127 is made in the form of a heavy angle with a flange 128 and a web 129. The drive assembly 148 includes a spring return air cylinder 150, mounted on the upper surface of the flange 128. The air cylinder 150 has a piston 151, extending into a hydraulic cylinder 149 operatively connected to an oil tank 164, shown for clarity in FIG. 4 as spaced from the air cylinder, and in FIG. 3 as being carried by the air cylinder as a convenient arrangement for supporting the tank 164. The hydraulic cylinder 149 is operatively connected, by means of a header line 154 and suitable fittings, to the rear ends of hydraulic drive cylinders 152 which operate drive rods 153 corresponding to the drive rods 53 of the first embodiment.

In FIG. 4, a detail of the way in which the slide rods 24 of both embodiments are anchored in the back plates is shown. Merely by way of illustration, the slide rods 24 are reduced at their outer ends to form an abutment shoulder to bear against the inner face of the web, and the outer ends are threaded to receive nuts 57. Alternatively, the threaded end can be extended and nuts mounted to bear on both sides of the web.

A single flexible air line 160, connected, by way of a valve, not here shown, to a source of air under pressure, is all that is required. The valve selectively either admits air under pressure to the air cylinder or permits it to exhaust, when a spring moves the hydraulic piston back.

The operation of the embodiment of vise assembly of FIGS. 3 and 4 is substantially the same as the assembly of FIGS. 1 and 2.

Figure 5:
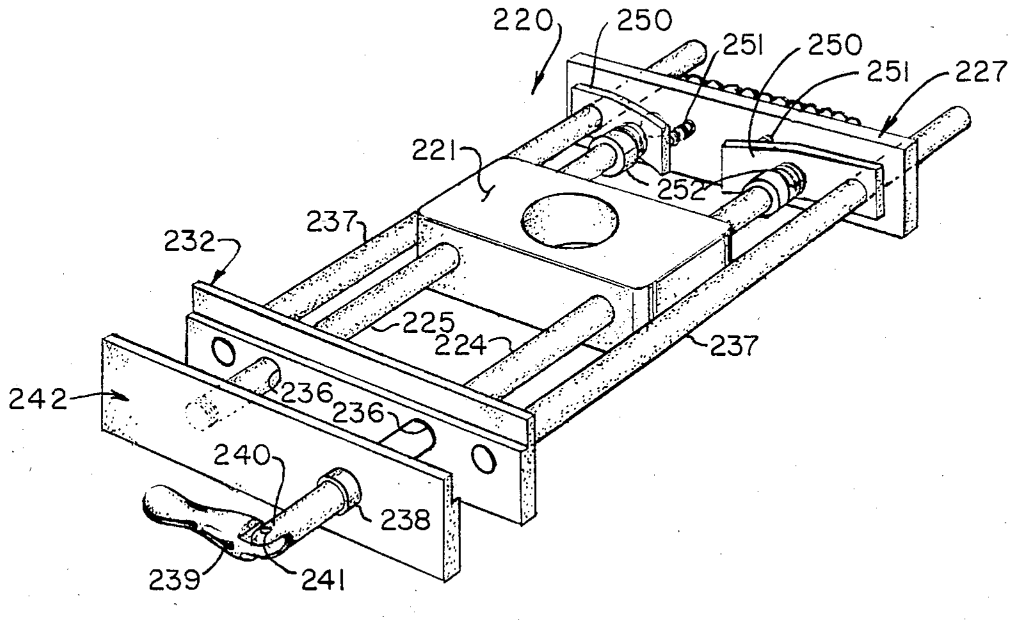
FIG. 5 is a view in perspective of still another embodiment of vise assembly.
Figure 6:
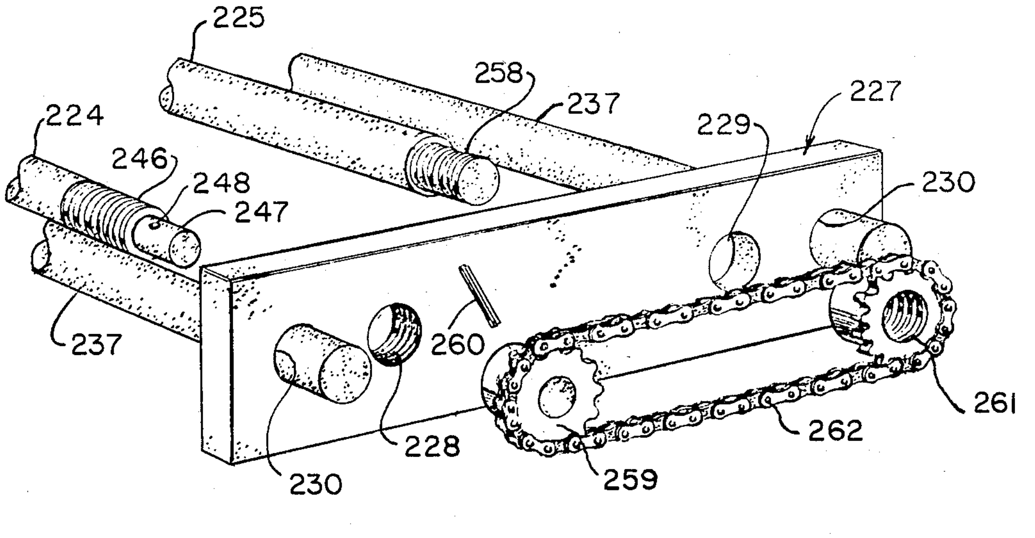
FIG. 6 is a fragmentary exploded view, somewhat enlarged, showing the rear of the assembly shown in FIG. 5.

Referring now to FIGS. 5 and 6 for still another embodiment of this invention, reference numeral 20 indicates a completed vise assembly which, in this embodiment, is completely self-contained, requiring no external valves, pressure lines or tank. The mounting block 221 can be identical to the mounting block 21 of the embodiments shown in FIGS. 1 and 3, with journal passages 223 corresponding to journal passages 23 in the mounting block 21. In this embodiment, tension rods 224 and 225 are slidably journaled in the journal passages 223. A back plate 227 is provided with four passages, an internally threaded passage 228 to receive a threaded section 246 of the tension rod 224, as shown particularly in FIG. 6, a smooth journal passage 229 to receive the tension bar 225, and, outboard of the passages 228 and 229, two slide rod passages 230. The slide rod passages 230 receive slide rods 237 slidably. The opposite ends of the slide rods 237 are securely mounted in a fixed jaw 232 as by threading an end of the rods into a tapped hole in a vertical surface of the jaw 232 in the way in which slide rods 24 are mounted in the fixed jaw 32 of the embodiment shown in FIGS. 1 and 2. The fixed jaw 232 has passages 236 slidably to receive the tension rods 224 and 225, as shown particularly in FIG. 5.

At its base plate end, tension rod 224 has a reduced, sprocket mounting section 247 with a diametric roll pin hole 248 through it, beyond the threaded section 246. At its other end, the tension bar 224 passes through a journal passage in a movable jaw 242. At its end projecting beyond the movable jaw 242, the rod 224 carries a handle 239 shown in FIG. 5 as hinged to the rod by means of a clevis 240 integral with the end of the rod, and a pin 241. A tension rod collar 238, secured to the tension rod 224, bears against the outside vertical surface of the movably jaw 242.

The outer end of the tension rod 225 is threaded and mounted in a tapped hole in the movable jaw 242, as shown in FIG. 5.

A drive sprocket 259 is mounted on the sprocket mounting end 247 of the tension rod 224 by means of a roll pin 260. A driven sprocket 261 has a hub with an internally left handed threaded bore, mounted on a threaded end 258 of the tension rod 225, but at a distance, for example, a half inch or so, from the inner end of the threaded portion.

In this illustrative embodiment, the tension rods 237, hence the fixed jaw 232 are selectively restrained against rearward movement with respect to the back plate 227 and the movable jaw 242 by locking bars 250. Each of the locking bars 250 has a slide rod receiving passage, drilled at an angle, as is well known for such devices, and is also provided with an oversized opening through which one of the tension rods 224 and 225 passes. The locking bars 250 are biased toward slide rod engaging position by compression springs 251 mounted on and extending between the rear side of the locking bars and the forward side of the back plate 227, as shown clearly in FIG. 5. In this particular embodiment, sliding collars 252 are mounted on the tension rods 224 and 225 between the mounting block 221 and the locking bars 250.

In the operation of the vise assembly of this embodiment, the entire frame is pulled forward until the collars 252 engage the mounting block 221 to rock the locking bars 250 against the bias of the compression spring 251 to release the slide rods 237. The fixed jaw 232 can then be moved manually rearwardly far enough to receive the work piece. The frame is then moved rearwardly to permit the compression springs 251 to rock the locking bars to locking position, preventing any further movement of the slide rods 237 with respect to the back plate 227 and the movable jaw 242. The jaws can then be tightened about the work piece, generally requiring a travel of no more than an eighth of an inch, by turning the tension rod 224 clockwise as viewed in FIG. 5, causing the rod 224 to be moved rearwardly by the engagement of the threads 246 with the threads in the threaded passage 228, and driving the sprocket 259, hence the driven sprocket 261, to move the rod 225 the same distance by virtue of the abutment of the hub of the sprocket 261 against the rear vertical surface of the back plate 227 and the engagement of the threads 258 of the tension rod 225 with the threads of the threaded bore of the sprocket 261. As has been explained, the threads 246 are right-hand threads, whereas the threads 258 are left-hand threads, so that the rods move in the same direction. As in the devices of the other embodiments, the entire frame can then be moved toward and away from the column or rotated, with the mounting block 221, with respect to the column to position the workpiece with respect to the drill.

Numerous variations in the construction of the vise assembly of this invention, within the scope of the appended claims, will occur to those skilled in the art in the light of the foregoing disclosure. Merely by way of illustration and not of limitation, a yoke arrangement can be utilized with the embodiments shown in FIGS. 1 through 4, to permit the use of a single cylinder, although such an arrangement requires a somewhat longer reach of the frame behind the column. Locking bar arrangements can be used with the embodiments employing hydraulic or pneumatic cylinders, permitting reducing the length of the cylinders drastically. The mounting block can be made in different forms from the rectangular solid form shown, and can be provided with passages for all four of the rods. The hydraulic cylinders can be used to provide tension rather than compression in the drive rods much as in the embodiment shown in FIGS. 5 and 6. In the mechanical version exemplified by the embodiment shown in FIGS. 5 and 6, both of the tension rods and their receiving passages in the back plate can be threaded in the same way, and both rods journaled for rotation in the movable jaw. Both can be provided with sprocket mounting sections and both sprockets can be secured to them by roll pins or the like. These variations are merely illustrative.

I claim:

1. A vise assembly for use on a drill press having a vertical cylindrical column, said assembly comprising mounting means slidably and rotatably mounted on and around said column and projecting laterally beyond said column on diametrically opposite sides, said mounting means having journal passages on either side of said column the long axes of which are parallel to one another and substantially perpendicular to said column; a pair of rods slidably journaled in said mounting means passages, said rods projecting from said mounting means in both directions; a second pair of rods extending paralled to said first pair of rods; a fixed vise jaw, one of said pairs of rods being mounted at one end to and against movement relative to said fixed vise jaw; a movable vise jaw, the other of said pairs of rods being connected at one end to said movable vise jaw; a back plate, both of said pairs of rods being mounted in said back plate; and means carried by said back plate for moving said movable jaw rods with respect to said fixed jaw rods, hence said movable jaw with respect to said fixed jaw, said mounting means supporting said rods and back plate, whereby said jaws can be moved concurrently toward and away from said column and can be rotated, while maintaining their positions relative to one another, about said column.

2. A vise assembly for use on a drill press having a vertical cylindrical column and a table with a flat upper surface substantially perpendicular to said column, said assembly comprising mounting means slidably and rotatably mounted on said vertical column, and a frame slidably mounted on said mounting means, parallel to the upper surface of said table, for movement toward and away from said column, said frame including a back plate, at least two pairs of rods connected to said back plate, at least one of said pairs of rods being journaled for lengthwise movement in said mounting means; fixed and movable jaws, one of said pairs of rods being connected to said fixed jaw and the other of said pairs of rods being connected to said movable jaw, and drive means carried by said frame for transmitting force between said back plate and said movable jaw for moving said movable jaw toward said fixed jaw, said frame being swingable about and translatable toward and away from said column.

3. The assembly of claim 2 wherein the rods of the pair connected to said fixed jaw are slidably journaled in said mounting means, and the drive means comprise hydraulic cylinders mounted at one end on said back plate outboard of said fixed jaw rods, and operatively connected to the pair of rods connected to said movable jaw.

4. The assembly of claim 2 wherein the drive means comprise threads on one pair of rods threaded into complimentary threaded members, and means for rotating said threads and threaded members relative to one another to move the rods, hence one jaw, relative to the other jaw.

5. The assembly of claim 4 wherein the rods of the pair of rods connected to the fixed jaw are selectively clamped in the back plate.

6. A vise assembly for use on a drill press having a vertical cylindrical column, said assembly comprising mounting means rotatably mounted on and around said column, projecting laterally beyond said column on either side; slide rods slidably journaled in said mounting means on either side of said column parallel to one another, said rods projecting beyond said column in both directions; a back plate carried by said rods at one end of said rods; a fixed jaw member mounted on the other end of said rods against movement with respect to said rods; a movable jaw member, and drive means supported by said back plate and connected to said movable jaw member for moving said movable jaw member with respect to said fixed jaw member.

7. A vise assembly for use on a drill press having a vertical column with a table with a flat upper surface substantially perpendicular to the long axis of said column, said assembly comprising a mounting block rotatably and slidably mounted on said column above the flat upper surface of said table, said mounting block having a pair of journal passages paralled to one another, one on either side of said column, the long axes of said journal passages lying in a plane parallel with said flat upper surface of said table; slide rods slidably mounted in said journal passages; a back plate carried by said slide rods at one end of said slide rods on the side of said column away from said table; a fixed jaw member mounted on the other end of said rods against movement with respect to said rods, said fixed jaw member having a lower surface resting on said flat upper surface of said table; a movable jaw member positioned between said fixed jaw member and said column, having parallel passages spaced and aligned slidably to receive said slide rods and a lower surface resting on said flat upper surface of said bed; and drive means, supported at one end by said back plate and extending between said back plate and said movable jaw member, for moving said movable jaw member toward and away from said fixed jaw member, said drive means comprising hydraulic cylinders mounted at one end on said back plate and having drive rods connected at their outer ends to said movable jaw member.

* * * * *